United States Patent
Sandhage

(10) Patent No.: US 12,365,631 B2
(45) Date of Patent: Jul. 22, 2025

(54) METHODS OF FABRICATING OXIDE/METAL COMPOSITES AND COMPONENTS PRODUCED THEREBY

(71) Applicant: Purdue Research Foundation, West Lafayette, IN (US)

(72) Inventor: Kenneth H. Sandhage, Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 391 days.

(21) Appl. No.: 17/892,091

(22) Filed: Aug. 21, 2022

(65) Prior Publication Data

US 2022/0411336 A1 Dec. 29, 2022

Related U.S. Application Data

(62) Division of application No. 16/783,793, filed on Feb. 6, 2020, now Pat. No. 11,434,173.

(Continued)

(51) Int. Cl.
*C04B 41/00* (2006.01)
*B64C 30/00* (2006.01)
(Continued)

(52) U.S. Cl.
CPC ............ *C04B 35/505* (2013.01); *B64C 30/00* (2013.01); *B64G 99/00* (2022.08); *C04B 35/4504* (2013.01); *C04B 35/62815* (2013.01); *C04B 35/62886* (2013.01); *C04B 41/009* (2013.01); *C04B 41/5045* (2013.01); *C04B 41/87* (2013.01); *C04B 2235/3225* (2013.01); *C04B 2235/3281* (2013.01); *C04B 2235/404* (2013.01); *C04B 2235/616* (2013.01)

(58) Field of Classification Search
None
See application file for complete search history.

(56) References Cited

U.S. PATENT DOCUMENTS 3,926,567 A * 12/1975 Fletcher .................. A61L 27/04
428/404
6,407,022 B1 * 6/2002 Sandhage ............. C22C 1/1036
501/80

(Continued)

*Primary Examiner* — Elizabeth Collister
(74) *Attorney, Agent, or Firm* — Hartman Global IP Law; Gary M. Hartman; Domenica N. S. Hartman

(57) ABSTRACT

Methods for producing oxide/metal composite components for use in high temperature systems, and components produced thereby. The methods use a fluid reactant and a porous preform that contains a solid oxide reactant. The fluid reactant contains yttrium as a displacing metal and the solid oxide reactant of the preform contains niobium oxide, of which niobium cations are displaceable species. The preform is infiltrated with the fluid reactant to react its yttrium with the niobium oxide of the solid oxide reactant and produce an yttria/niobium composite component, during which yttrium at least partially replaces the niobium cations of the solid oxide reactant to produce yttria and niobium metal, which together define a reaction product. The pore volume of the preform is at least partially filled by the reaction product, whose volume is greater than the volume lost by the solid oxide reactant as a result of reacting yttrium and niobium oxide.

19 Claims, 1 Drawing Sheet

Related U.S. Application Data

(60) Provisional application No. 62/802,466, filed on Feb. 7, 2019.

(51) Int. Cl.
*B64G 99/00* (2009.01)
*C04B 35/45* (2006.01)
*C04B 35/505* (2006.01)
*C04B 35/628* (2006.01)
*C04B 41/50* (2006.01)
*C04B 41/87* (2006.01)

(56) References Cited

U.S. PATENT DOCUMENTS

| | | | |
|---|---|---|---|
| 6,598,656 B1 * | 7/2003 | Sandhage | C22C 1/1068 |
| | | | 164/97 |
| 2007/0026246 A1 * | 2/2007 | Harada | C23C 28/321 |
| | | | 427/446 |

* cited by examiner

METHODS OF FABRICATING OXIDE/METAL COMPOSITES AND COMPONENTS PRODUCED THEREBY

CROSS REFERENCE TO RELATED APPLICATIONS

This is a division patent application of co-pending U.S. patent application Ser. No. 16/783,793, filed Feb. 6, 2020, which claims the benefit of U.S. Provisional Application No. 62/802,466 filed Feb. 7, 2019. The contents of these prior applications are incorporated herein by reference.

BACKGROUND OF THE INVENTION

The present invention generally relates to high temperature composites and components comprising such composites. The invention particularly relates to methods of fabricating net-shape/size composites containing a high-melting oxide and a thermally-conductive refractory metal, including but not limited to components formed therefrom that are capable of use in hypersonic applications and other high temperature systems.

New hypersonic components and vehicles require advanced, high-melting materials that are thermally, chemically, and mechanically robust materials. Also required are cost-effective methods for manufacturing such materials and components in complex (preferably near net) shapes. One class of such robust materials is composites of ceramics with refractory metals.

BRIEF DESCRIPTION OF THE INVENTION

The present invention generally provides mechanically-robust, thermally-robust, and chemically-robust oxide/metal composite materials for high temperature applications, components comprising such oxide/metal composite materials, methods of manufacturing such components, and systems comprising such components.

According to one aspect of the invention, a method of producing an oxide/metal composite component for use in a high temperature system involves providing a fluid reactant and a porous preform that has a pore volume and contains a solid oxide reactant that defines a solid volume of the porous preform. The fluid reactant comprises at least yttrium as a displacing metal and the solid oxide reactant of the preform comprises at least niobium oxide in which niobium cations in the niobium oxide are displaceable species. The yttrium of the fluid reactant is capable of displacing the niobium cations in the solid oxide reactant to produce at least yttria (yttria is used to refer herein to yttrium oxide) as a solid oxide reaction product and niobium metal as a solid metal reaction product. The porous preform is then infiltrated with the fluid reactant to react the yttrium of the fluid reactant with the niobium oxide of the solid oxide reactant to produce the oxide/metal composite component, during which the yttrium of the fluid reactant at least partially replaces the niobium cations of the solid oxide reactant to produce the yttria and the niobium metal that together define a reaction product volume. The pore volume is at least partially filled by the reaction product volume, the reaction product volume is greater than the solid volume lost by the solid oxide reactant as a result of the reaction of the yttrium and the niobium oxide, and the oxide/metal composite component comprises an yttria/niobium composite containing at least yttria and niobium metal.

Another aspect of the invention is the oxide/metal composite component produced by methods as described above.

Technical effects of methods as described above preferably include the ability to produce components of ceramic/refractory metal composites that are thermally, chemically, and mechanically robust and can be produced by a cost-effective method to have complex and preferably near net shapes.

Other aspects and advantages of this invention will be appreciated from the following detailed description.

DETAILED DESCRIPTION OF THE INVENTION

Figure 1A:
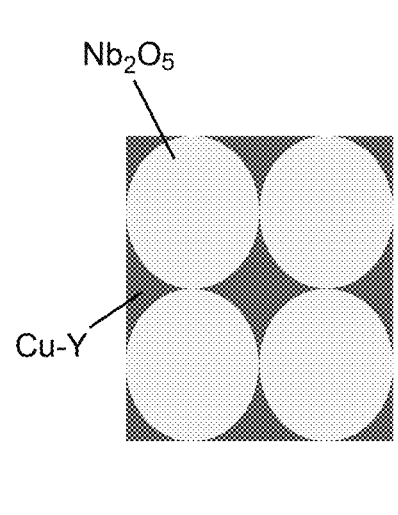
FIGS. 1A, 1B, and 1C schematically illustrate a displacive compensation of porosity (DCP) process by which an yttrium-bearing liquid, (Cu—Y), infiltrates a porous niobium oxide ($Nb_2O_5$) preform (FIG. 1A) and undergoes a pore-filling liquid/solid displacement reaction (FIG. 1B) to yield a dense net-size $Y_2O_3$/Nb cermet (FIG. 1C).
Figure 1B:
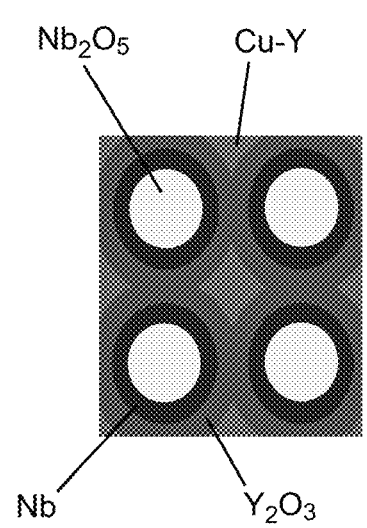
Figure 1C:
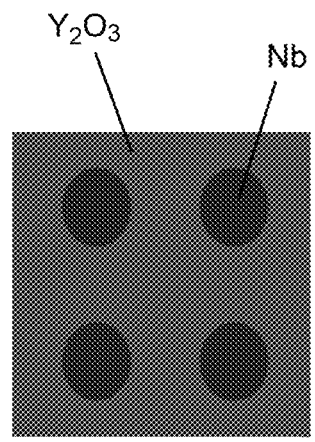

The present invention generally provides oxide/metal composites and oxide/metal composite components, and most particularly oxide/refractory metal composite components suitable for high temperature applications, methods of manufacturing such components, and systems comprising such components. Such high-temperature systems include, but are not limited to, hypersonic applications that include, but are not limited to, aircraft, spacecraft, missiles, and energy conversion devices. Such oxide/metal composite components suitable for use in high temperature systems include, but are not limited to, components that form the leading edges of hypersonic aircraft, spacecraft, missiles, and energy conversion devices, which may be subjected to temperatures exceeding 500° C. and up to at least 2000° C. According to a nonlimiting aspect of the invention, the components may be manufactured to be near-net shape and near-net size, and exhibit desirable high-temperature properties such as high melting temperatures, stiffness, creep resistance, fracture resistance, erosion resistance, plastic deformation resistance, thermal cycling resistance, thermal shock resistance, corrosion resistance, thermal conductivity, electrical conductivity, and/or oxidation resistance at temperatures of at least 500° C. and up to at least 2000° C.

In order to manufacture oxide/metal composite components suitable for use in high temperature applications, and in particular having high temperature properties such as described above, the components are preferably formed to near-net shape and near-net dimensions by a cost-effective, shape-preserving, pressureless reactive infiltration process referred to herein as a displacive compensation of porosity (DCP) process. Such processes are described in detail in U.S. Pat. Nos. 6,407,022; 6,598,656; and 6,833,337 to Sandhage et al., the contents of which are incorporated herein by reference in their entirety.

Briefly, DCP processes include synthesis or other acquisition of a porous preform with an appropriate composition and pore fraction, and preferably having the overall shape of the intended component. The pore fraction of the preform is tailored so that a reaction-induced increase in solid volume can compensate partially or completely for such porosity. From the following discussion it will be appreciated that the porous preform need only be sufficiently dimensionally stable to resist the capillary action of an infiltrated fluid reactant. The porous preform is infiltrated with the fluid reactant, which is caused to react partially or completely with the solid preform to produce a dense, shaped body containing the desired ceramic and refractory metal phases. A phase is defined herein as a homogeneous volume of matter. This reaction is a displacement reaction of the following general type between a metal species, {M}, of the fluid reactant and a ceramic compound, $N_AO_B(s)$, of the solid shaped porous preform, serving as a solid oxide reactant.

$$C\{M\}+N_AO_B(s)=M_CO_B(s)+AN(s)$$

$M_CO_B(s)$ is a solid oxide reaction product, N(s) is a solid metal reaction product, and A, B and C are molar coefficients. Reactions are chosen such that the solid reaction products (i.e., AN(s) and/or $M_CO_B(s)$) possess a volume that is larger than the solid oxide reactant, $N_AO_B(s)$, consumed by the reaction. Such an increase in solid volume upon reaction is used to completely fill the original pore spaces within the initial porous $N_AO_B(s)$ preform; that is, the displacement reaction is used to compensate for (i.e., fill) the prior pore volume (displacive compensation of porosity).

According to a preferred aspect of the invention, oxide/refractory metal composite components suitable for hypersonic applications comprise or consist of an $Y_2O_3$/Nb composite. $Y_2O_3$ (yttria) and Nb (niobium metal) are each high melting materials (2404° C. and 2469° C., respectively) and are chemically compatible with each other (that is, a displacement reaction between Nb and $Y_2O_3$ is not thermodynamically favored). Unlike many ceramic/metal composites, $Y_2O_3$ and Nb possess very similar coefficients of thermal expansion (CTE). As shown in the Table 1 below, the values of linear expansion ($\Delta L/L_O$) of polycrystalline $Y_2O_3$ and Nb agree to within 10% over a wide temperature range, starting at 250° C. (or lower) and up to and including at least 2000° C.

does not form any compounds with niobium, and niobium exhibits only slight solubility in liquid copper (e.g., <1 wt % at 1150° C.). Yttrium and niobium also do not react to form any intermetallic compounds, and exhibit negligible mutual solid solubility (i.e., niobium metal formed by reaction (1) will not undergo further reaction with yttrium to form any Nb—Y compounds). Reaction (1) is highly thermodynamically favored at modest temperatures (e.g., $\Delta G°_{rxn(1)}$[1127° C.] is −3,639 kJ per mole of reaction). Furthermore, the total volume of the solid products of this reaction (5 moles of $Y_2O_3$ and 6 moles of Nb=290 cm³) is significantly larger than the volume of the solid reactant (3 moles of $Nb_2O_5$=176 cm³).

$$V_{Solid\ Products}[6Nb+5Y_2O_3]>V_{Solid\ Reactant}[3Nb_2O_5]$$

Consequently, a porous, near net shape preform of $Nb_2O_5$ can be converted via the liquid/solid displacement reaction (1) into a dense $Y_2O_3$/Nb composite; that is, the displacement reaction can be used to entirely fill the pores in the preform.

The phase content of the final $Y_2O_3$/Nb composite can be adjusted over a wide range via control of the $Nb_2O_5$ preform porosity and by controlled additions of additional Nb metal to the $Nb_2O_5$ in the preform for the purpose of adjusting (increasing) the total niobium (both oxide and metal) content of the preform.

While it expected that dense, thermal shock resistant, net-shape $Y_2O_3$/Nb composites can be fabricated by the reactive infiltration-based DCP process, the Nb in such composites may not be adequately resistant to oxidation, particularly at high temperatures and high oxygen partial pressures. To inhibit Nb oxidation, the $Y_2O_3$/Nb composite may be coated with a dense layer that inhibits oxygen diffusion. A particular but nonlimiting example is a dense layer (coating) of $Y_2O_3$ that may be deposited by various

TABLE 1

| Material | Percentage of linear expansion, 100 · $\Delta L/L_o$ (relative to room temperature) | | | | | | | |
|---|---|---|---|---|---|---|---|---|
| | 250° C. | 500° C. | 750° C. | 1000° C. | 1250° C. | 1500° C. | 1750° C. | 2000° C. |
| $Y_2O_3$ | 0.16% | 0.34% | 0.54% | 0.76% | 1.00% | 1.26% | 1.54% | 1.84% |
| Nb | 0.17% | 0.37% | 0.58% | 0.80% | 1.03% | 1.27% | 1.49% | 1.76% |

The ductility of the Nb phase over a wide range of temperatures is believed to endow the oxide/metal composite components with enhanced toughness (relative to monolithic $Y_2O_3$). Such ductility, coupled with the similar CTE values of Nb and $Y_2O_3$, also provide for enhanced thermal shock resistance. An interconnected $Y_2O_3$ phase in such composites should, in turn, enhance the high-temperature stiffness of the components (relative to monolithic Nb).

The composite components may be fabricated in complex and preferably near net shapes by the DCP process on the basis of the following displacement reaction between a yttrium-bearing liquid as the fluid reactant and solid $Nb_2O_5$ as the solid oxide reactant of the preform, whereby yttrium of the fluid reactant at least partially replaces the niobium cations in the niobium oxide of the solid oxide reactant to produce yttria and niobium metal.

$$10\{Y\}+3Nb_2O_5(s)=>5Y_2O_3(s)+6Nb(s) \quad (1)$$

The fluid reactant, {Y}, may comprise or consist of yttrium dissolved within a Cu—Y liquid, such as a $Cu_1Y_1$ liquid ($Cu_1Y_1$ melts congruently at 947° C., which is appreciably lower than the 1522° C. melting point of pure Y). In addition to acting as an effective solvent for yttrium, copper deposition processes. As an example, an yttria layer can be generated by processes that use various forms of physical vapor deposition, chemical vapor deposition, or air plasma spraying, or by one or more of: a sol-gel dip coating and firing process, a powder slurry dip coating and firing process, a slip casting process, a laser deposition process, a plasma spraying process, a flame spraying process, an electrophoretic deposition process, and a hot isostatic pressing process. A final high-temperature firing process may be used to promote diffusion bonding of the $Y_2O_3$ layer to the surface of the $Y_2O_3$/Nb composite. Oxygen diffusion through dense $Y_2O_3$ has been found to be very slow. The following Arrhenius relation has been reported for oxygen lattice diffusion through $Y_2O_3$ over a temperature range of 1100-1500° C.

$$D_O=7.3\times10^{-6}\exp[-191\ kJ/RT]cm^2/sec \quad (2)$$

Extrapolation of this equation to 2200° C. yields a value of $D_O$=6.7×10⁻¹⁰ cm²/sec. For a time of 30 minutes at 2200° C., this value of $D_O$ yields an effective diffusion distance, $(Dt)^{1/2}$, of only 1.1×10⁻³ cm (11 μm). Hence, a 100 μm thick (0.1 mm) or thicker $Y_2O_3$ coating on an $Y_2O_3$/Nb composite should endow the composite with a desirable level of oxidation resistance for low-altitude hypersonic flight.

While high-melting, $Y_2O_3$-coated, $Y_2O_3$/Nb composites are believed to possess a desirable resistance to oxidation and thermal shock at temperatures in excess of 2200° C., other potential oxide-coated, oxide/refractory metal composites that can be fabricated by the net-shape DCP process are foreseeable, including other combinations of high-melting oxides and refractory metals (e.g., W, Mo, Ta, Nb, Hf, etc.).

The DCP process is particularly well suited for producing the $Y_2O_3$/Nb composites, as it provides a cost-effective method for fabricating net-shape and net-size oxide/metal composites, i.e., without the sintering shrinkage encountered in conventional ceramics processing and without the need for appreciable costly machining, or chemical etching of metallic alloys. The resulting composite components may have high melting temperatures, may be mechanically robust, thermally robust, and chemically robust, and may be thermally and/or electrically conductive. As such, the application of such oxide/metal composite components formed by the DCP process to high-temperature systems provides significant advantages over conventional high-temperature metallic alloys or ceramic composites made by conventional methods.

While the invention has been described in terms of specific or particular embodiments, it should be apparent that alternatives could be adopted by one skilled in the art. For example, the components could have different compositions than those described herein, process parameters such as temperatures and durations could be modified, and appropriate materials could be substituted for those noted. Accordingly, it should be understood that the invention is not necessarily limited to any embodiment described herein. It should also be understood that the phraseology and terminology employed above are for the purpose of describing the disclosed embodiments, and do not necessarily serve as limitations to the scope of the invention. Therefore, the scope of the invention is to be limited only by the following claims.

The invention claimed is:

1. An oxide/metal composite component for use in a system in which the oxide/metal composite component is subjected to elevated temperatures exceeding 500° C. and up to at least 2000° C., the oxide/metal composite component produced by a method comprising:
   providing a fluid reactant and a porous preform that has a pore volume and contains a solid oxide reactant that defines a solid volume of the porous preform, the fluid reactant comprising at least yttrium as a displacing metal and the solid oxide reactant of the preform comprising at least niobium oxide in which niobium cations in the niobium oxide are displaceable species, the yttrium of the fluid reactant being capable of displacing the niobium cations in the solid oxide reactant to produce at least yttria as a solid oxide reaction product and niobium metal as a solid metal reaction product; and
   infiltrating the porous preform with the fluid reactant by means of a pressureless reactive infiltration process to react the yttrium of the fluid reactant with the niobium oxide of the solid oxide reactant to produce the oxide/metal composite component of niobium metal particles dispersed within a matrix of yttria without forming diffusion bonds between the niobium metal particles and the yttria, during which the yttrium of the fluid reactant at least partially replaces the niobium cations of the solid oxide reactant to produce the yttria and the niobium metal that together define a reaction product volume, the pore volume is at least partially filled by the reaction product volume, and the reaction product volume is greater than the solid volume lost by the solid oxide reactant as a result of the reaction of the yttrium and the niobium oxide, wherein the oxide/metal composite component comprises an yttria/niobium composite containing at least the yttria and the niobium metal without diffusion bonds between the niobium metal particles and the yttria.

2. The oxide/metal composite component of claim 1, wherein the fluid reactant further comprises copper and the yttrium of the fluid reactant reacts with the niobium oxide at a temperature that is lower the melting point of yttrium.

3. The oxide/metal composite component of claim 2, wherein the fluid reactant is a Cu—Y liquid.

4. The oxide/metal composite component of claim 1, wherein the oxide/metal composite component is disposed in the system and exposed to temperatures greater than 500° C. and up to at least 2000° C. in the system, wherein the yttria and the niobium metal exhibit linear thermal expansion values within 10% of one another throughout a temperature range of 250° C. to at least 2000° C.

5. The oxide/metal composite component of claim 4, wherein the system is in an application in which the oxide/metal composite component is subjected to velocities of Mach 5 and above.

6. The oxide/metal composite component of claim 5, wherein the application is chosen from the group consisting of aircraft, spacecraft, missiles, and energy conversion devices.

7. The oxide/metal composite component of claim 1, wherein the oxide/metal composite component is at an edge of an aircraft, spacecraft, missile, or energy conversion device and is subjected to velocities of Mach 5 and above.

8. The oxide/metal composite component of claim 1, further comprising adjusting amounts of the yttria and the niobium metal in the oxide/metal composite component by adding additional niobium metal to the porous preform prior to the infiltrating step.

9. The oxide/metal composite component of claim 1, further comprising an yttria coating on the oxide/metal composite component.

10. The oxide/metal composite component of claim 9, wherein the yttria coating is generated by one or more of physical vapor deposition, chemical vapor deposition, and air plasma spraying.

11. The oxide/metal composite component of claim 9, wherein the yttria coating is generated by one or more of: a sol-gel dip coating and firing process, a powder slurry dip coating and firing process, a slip casting process, a laser deposition process, a plasma spraying process, a flame spraying process, an electrophoretic deposition process, and a hot isostatic pressing process.

12. An oxide/metal composite component for use in a system in which the oxide/metal composite component is subjected to elevated temperatures exceeding 500° C. and up to at least 2000° C., the oxide/metal composite component produced by a method comprising:
   providing a fluid reactant and a porous preform that has a pore volume and contains a solid oxide reactant that defines a solid volume of the porous preform, the fluid reactant comprising a Cu—Y liquid that contains yttrium as a displacing metal and the solid oxide reactant of the preform consisting of niobium oxide in which niobium cations in the niobium oxide are displaceable species, the yttrium of the fluid reactant being capable of displacing the niobium cations in the solid oxide reactant to produce yttria as a solid oxide reaction product and niobium metal as a solid metal reaction product;

infiltrating the porous preform with the fluid reactant by means of a pressureless reactive infiltration process to react the yttrium of the fluid reactant with the niobium oxide of the solid oxide reactant at a temperature that is lower the melting point of yttrium to produce the oxide/metal composite component of niobium metal particles dispersed within a matrix of yttria without forming diffusion bonds between the niobium metal particles and the yttria, during which the yttrium of the fluid reactant replaces the niobium cations of the solid oxide reactant to produce the yttria and the niobium metal that together define a reaction product volume, the pore volume is filled by the reaction product volume, and the reaction product volume is greater than the solid volume lost by the solid oxide reactant as a result of the reaction of the yttrium and the niobium oxide, wherein the oxide/metal composite component comprises an yttria/niobium composite containing the yttria and niobium metal without diffusion bonds between the niobium metal particles and the yttria; and forming an yttria coating on the oxide/metal composite component.

13. The oxide/metal composite component of claim 12, wherein the oxide/metal composite component is disposed in the system and exposed to temperatures greater than 500° C. and up to at least 2000° C. in the system, wherein the yttria and the niobium metal exhibit linear thermal expansion values within 10% of one another throughout a temperature range of 250° C. to at least 2000° C.

14. The oxide/metal composite component of claim 13, wherein the system is in an application in which the oxide/metal composite component is subjected to velocities of Mach 5 and above.

15. The oxide/metal composite component of claim 14, wherein the application is chosen from the group consisting of aircraft, spacecraft, missiles, and energy conversion devices.

16. The oxide/metal composite component of claim 12, wherein the oxide/metal composite component is at an edge of an aircraft, spacecraft, missile, or energy conversion device and is subjected to velocities of Mach 5 and above.

17. The oxide/metal composite component of claim 12, further comprising adjusting amounts of the yttria and the niobium metal in the oxide/metal composite component by adding additional niobium metal to the porous preform prior to the infiltrating step.

18. An oxide/metal composite component for use in a system in which the oxide/metal composite component is subjected to elevated temperatures exceeding 500° C. and up to at least 2000° C., the oxide/metal composite component produced by a method comprising:

providing a fluid reactant and a porous preform that has a pore volume and contains a solid oxide reactant that defines a solid volume of the porous preform, the fluid reactant comprising at least yttrium as a displacing metal and the solid oxide reactant of the preform comprising at least one oxide in which cations of the oxide are displaceable cation species, the displacing metal of the fluid reactant being capable of displacing the cations in the solid oxide reactant to produce at least a solid oxide reaction product and a solid metal reaction product; and infiltrating the porous preform with the fluid reactant by means of a pressureless reactive infiltration process to react the displacing metal of the fluid reactant with the displaceable cation species of the solid oxide reactant to produce the oxide/metal composite component of niobium metal particles dispersed within a matrix of yttria without forming diffusion bonds between the niobium metal particles and the yttria, during which the displacing metal of the fluid reactant at least partially replaces the displaceable cation species of the solid oxide reactant to produce the solid oxide reaction product and the solid metal reaction product that together define a reaction product volume, the pore volume is at least partially filled by the reaction product volume, and the reaction product volume is greater than the solid volume lost by the solid oxide reactant as a result of the reaction of the displacing metal and the solid oxide reactant, wherein the oxide/metal composite component comprises an oxide/metal composite without diffusion bonds between the niobium metal particles and the yttria and the solid oxide reaction product of the oxide/metal composite possesses linear thermal expansion values within 10% of linear thermal expansion values of the solid metal reaction product throughout a temperature range of 250° C. to at least 2000° C.

19. The oxide/metal composite component of claim 18, wherein the solid metal reaction product of the oxide/metal composite is niobium, and the solid oxide reaction product of the oxide/metal composite is yttria and possesses linear thermal expansion values within 5% of linear thermal expansion values of the solid metal reaction product throughout a temperature range of 1000° C. to at least 2000° C.

* * * * *